United States Patent
Dierksmeier et al.

(10) Patent No.: US 10,563,670 B2
(45) Date of Patent: Feb. 18, 2020

(54) VANE ACTUATION SYSTEM FOR A GAS TURBINE ENGINE

(71) Applicants: Rolls-Royce Corporation, Indianapolis, IN (US); Rolls-Royce North American Technologies, Inc., Indianapolis, IN (US)

(72) Inventors: Douglas D. Dierksmeier, Franklin, IN (US); Edward C. Rice, Indianapolis, IN (US); Ryan C. Humes, Indianapolis, IN (US)

(73) Assignees: Rolls-Royce Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 200 days.

(21) Appl. No.: 15/655,431

(22) Filed: Jul. 20, 2017

(65) Prior Publication Data

US 2018/0031001 A1 Feb. 1, 2018

Related U.S. Application Data (60) Provisional application No. 62/368,613, filed on Jul. 29, 2016.

(51) Int. Cl.
| | |
|---|---|
| F04D 29/56 | (2006.01) |
| F04D 29/54 | (2006.01) |
| F04D 29/52 | (2006.01) |
| F02C 3/04 | (2006.01) |

(52) U.S. Cl.
CPC ......... *F04D 29/563* (2013.01); *F04D 29/522* (2013.01); *F04D 29/542* (2013.01); *F02C 3/04* (2013.01); *F05D 2220/32* (2013.01); *F05D 2260/57* (2013.01)

(58) Field of Classification Search
CPC ... F01D 17/162; F04D 29/563; F05D 2260/90
See application file for complete search history.

(56) References Cited

U.S. PATENT DOCUMENTS

| | | | | |
|---|---|---|---|---|
| 4,755,104 A * | 7/1988 | Castro | ........... | F01D 17/162 384/206 |
| 4,836,746 A * | 6/1989 | Owsianny | ........... | F01D 17/162 415/149.2 |
| 5,224,820 A * | 7/1993 | Brichet | ........... | F01D 17/162 415/150 |
| 5,466,122 A * | 11/1995 | Charbonnel | ........... | F01D 17/162 415/139 |
| 5,993,152 A | 11/1999 | Schilling | | |
| 6,688,846 B2 | 2/2004 | Caubet et al. | | |
| 7,011,494 B2 * | 3/2006 | Kies | ........... | F01D 17/162 415/148 |
| 7,575,409 B2 | 8/2009 | Dierksmeier et al. | | |

(Continued)

*Primary Examiner* — Ninh H. Nguyen
(74) *Attorney, Agent, or Firm* — Barnes & Thornburg LLP (57) ABSTRACT

A compressor for use in a gas turbine engine is disclosed herein. The compressor includes a case, vanes, and a vane actuation system. The vanes are arranged circumferentially adjacent to one another about a central axis inside the case and each one of the vanes is configured for rotation about a vane axis generally perpendicular to the central axis. The vane actuation system is configured to cause rotation of at least one of the vanes about the vane axis.

19 Claims, 4 Drawing Sheets

(56) References Cited

U.S. PATENT DOCUMENTS

| | | |
|---|---|---|
| 7,690,889 B2 | 4/2010 | Giaimo et al. |
| 8,727,697 B2 * | 5/2014 | Eifert .................... F01D 17/162 415/1 |
| 2009/0285673 A1 | 11/2009 | Giaimo et al. |
| 2012/0076641 A1 | 3/2012 | Jarrett, Jr. et al. |
| 2014/0286745 A1 | 9/2014 | Rusovici |

* cited by examiner

VANE ACTUATION SYSTEM FOR A GAS TURBINE ENGINE

CROSS REFERENCE TO RELATED APPLICATIONS

This application claims priority to and the benefit of U.S. Provisional Patent Application No. 62/368,613, filed 29 Jul. 2016, the disclosure of which is now expressly incorporated herein by reference.

FIELD OF THE DISCLOSURE

The present disclosure relates generally to gas turbine engines, and more specifically to compressors included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and the air-fuel mixture is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors typically include multiple stages of static vane assemblies and rotating blade assemblies. Air drawn into the compressor passes over the static vane assemblies and is provided to the rotating blade assemblies to increase the pressure of the air. The angles at which vanes of the static vane assemblies provide air to blades of the rotating blade assemblies may impact performance of gas turbine engines. As such, adjustment of those angles to improve gas turbine engine performance remains an area of interest.

SUMMARY

The present disclosure may comprise one or more of the following features and combinations thereof.

According to one combination, a compressor may include a case and a plurality of vanes. The case may extend circumferentially about a central axis. The plurality of vanes may be arranged circumferentially adjacent to one another about the central axis inside the case, each one of the vanes configured for rotation about a vane axis generally perpendicular to the central axis.

In illustrative embodiments, the compressor may include a vane actuation system. The vane actuation system may include an actuator and an actuation ring. The actuation ring may be coupled to one of the vanes and arranged radially inward of a portion of the case relative to the central axis. The actuator may be configured to drive movement of the actuation ring to cause rotation of the one of the vanes about the vane axis.

In illustrative embodiments, the vane actuation system may include a first actuation arm arranged radially outward of the portion of the case relative to the central axis. The first actuation arm may be coupled to the actuator and the actuation ring to cause movement of the first actuation arm driven by the actuator to drive movement of the actuation ring.

In illustrative embodiments, the vane actuation system may include a second actuation arm arranged radially inward of the portion of the case relative to the central axis. The second actuation arm may be coupled to the actuation ring and the one of the vanes to cause movement of the second actuation arm driven by the actuation ring to drive rotation of the one of the vanes about the vane axis.

In illustrative embodiments, the actuation ring may be formed to include a groove sized to receive a follower. The follower may be coupled directly to the second actuation arm such that movement of the actuation ring drives movement of the follower in the groove to drive movement of the second actuation arm.

In illustrative embodiments, the case may be an annular case component having a one-piece construction. The actuation ring may be an annular component having a two-piece construction.

In illustrative embodiments, actuation ring may be configured to couple to the annular case component of the case when the compressor is assembled. The actuation ring may be formed to include a plurality of circumferential channels opening toward the annular case component and sized to receive a plurality of rollers configured to engage the annular case component to permit movement of the actuation ring relative to the annular case component.

In illustrative embodiments, each of the plurality of circumferential channels can be sized to receive a plurality of spacers that are each arranged between circumferentially adjacent rollers and configured to control spacing between the circumferentially adjacent rollers. The actuation ring may be formed to include a plurality of grooves arranged between the circumferential channels and spaced from one another about the central axis.

In illustrative embodiments, the plurality of vanes may include a first stage of vanes and a second stage of vanes located aft of the first stage of vanes along the central axis. The actuation ring may be coupled to one of the first stage of vanes and one of the second stage of vanes. The actuator may be configured to drive movement of the actuation ring to cause rotation of the one of the first stage of vanes about a first vane axis and rotation of the one of the second stage of vanes about a second vane axis.

In illustrative embodiments, the compressor may include a vane actuation system. The vane actuation system may include an actuator and an actuation ring. The actuation ring may be coupled to one of the vanes and may be arranged radially inward of a portion of the case relative to the central axis. The actuator might further be configured to drive translation of the actuation ring along the central axis to cause rotation of the one of the vanes about the vane axis.

In illustrative embodiments, the vane actuation system may include a first actuation arm coupled to the actuator and the actuation ring to cause movement of the first actuation arm driven by the actuator to drive translation of the actuation ring along the central axis. The vane actuation system may include a second actuation arm coupled to the actuation ring and the one of the vanes to cause movement of the second actuation arm driven by the actuation ring to drive rotation of the one of the vanes about the vane axis.

In illustrative embodiments, the actuation ring may be formed to include a groove sized to receive a follower. The follower may be coupled directly to the second actuation arm such that translation of the actuation ring along the central axis drives movement of the follower in the groove to drive movement of the second actuation arm.

In illustrative embodiments, the groove may include a forward end and an aft end arranged aft of the forward end along the central axis. Each of the forward and aft ends may extend generally parallel to the central axis.

In illustrative embodiments, the compressor may include a vane actuation system including an actuator and an actuation ring coupled to one of the vanes. The actuation ring may be arranged radially inward of a portion of the case relative to the central axis. The actuator may be configured to drive rotation of the actuation ring about the central axis to cause rotation of the one of the vanes about the vane axis.

In illustrative embodiments, the actuation ring may be formed to include a plurality of circumferential channels opening toward the case and sized to receive a plurality of rollers. The rollers may be configured to engage the case to permit rotation of the actuation ring about the central axis relative to the case.

In illustrative embodiments, the vane actuation system may include a first actuation arm and a second actuation arm. The first actuation arm may be coupled to the actuator and the actuation ring to cause movement of the first actuation arm driven by the actuator to drive rotation of the actuation ring about the central axis. The second actuation arm may be coupled to the actuation ring and the one of the vanes to cause movement of the second actuation arm driven by the actuation ring to drive rotation of the one of the vanes about the vane axis.

In illustrative embodiments, the actuation ring may be formed to include a groove sized to receive a follower. The follower may be coupled directly to the second actuation arm such that rotation of the actuation ring about the central axis drives movement of the follower in the groove to drive movement of the second actuation arm. The groove may include a forward end and an aft end arranged aft of the forward end along the central axis. Each of the forward and aft ends may extend at an angle to the central axis.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments illustrated in the drawings and specific language will be used to describe the same.

Figure 1:
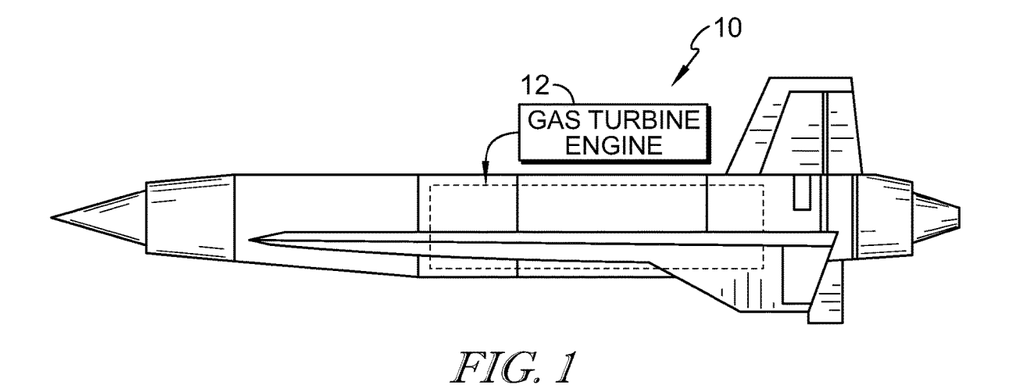
FIG. 1 is a side elevation view of a missile showing diagrammatically that the missile includes a gas turbine engine adapted to propel the missile so that the missile may operate as an independent air vehicle when separated from an aircraft.

Referring now to FIG. 1, a secondary air vehicle 10 adapted for use with an aircraft (not shown) is illustratively embodied as, or otherwise includes, a missile. In other embodiments, however, the secondary air vehicle 10 may be embodied as, or otherwise include, another suitable aircraft vehicle, spacecraft vehicle, air vehicle, or the like.

Figure 2:
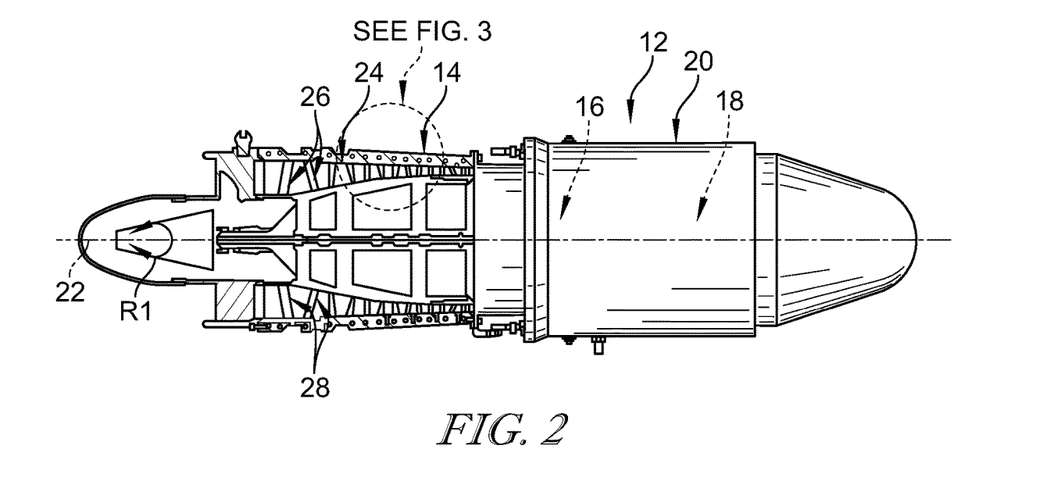
FIG. 2 is a partially cut-away view of the gas turbine engine of FIG. 1 showing that the gas turbine engine includes a compressor, a combustor, and a turbine and the cut-away portion cross-sectionally showing that the compressor includes a case, a bladed compressor rotor, and a plurality of vanes.

The secondary air vehicle 10 illustratively includes a gas turbine engine 12 as shown diagramatically in FIG. 1. As best seen in FIG. 2, the gas turbine engine 12 includes a compressor 14, a combustor 16, and a turbine 18 mounted to and supported by an engine case 20 extending about a central axis 22. The compressor 14 compresses air drawn into the engine 12 and delivers compressed air to the combustor 16. The combustor 16 mixes fuel with the compressed air received from the compressor 14 and ignites the air-fuel mixture. The hot, high-pressure products of the combustion reaction in the combustor 16 are directed into the turbine 18 and the turbine 18 extracts work to drive the compressor 14.

Referring again to FIG. 2, the compressor 14 illustratively includes a compressor case 24 extending about the central axis 22 and vanes 26 arranged inside the compressor case 24. The compressor case 24 may be integrally formed with, or separately formed from, the engine case 20. The vanes 26 are arranged in vane stages 28 that are spaced apart from one another along the central axis 22. In each vane stage 28, the vanes 26 are arranged circumferentially adjacent to one another about the central axis 22 inside the compressor case 24. Additionally, in each vane stage 28, each one of the vanes 26 is configured for rotation about a vane axis 30 that is generally perpendicular to the central axis 22.

Figure 3:
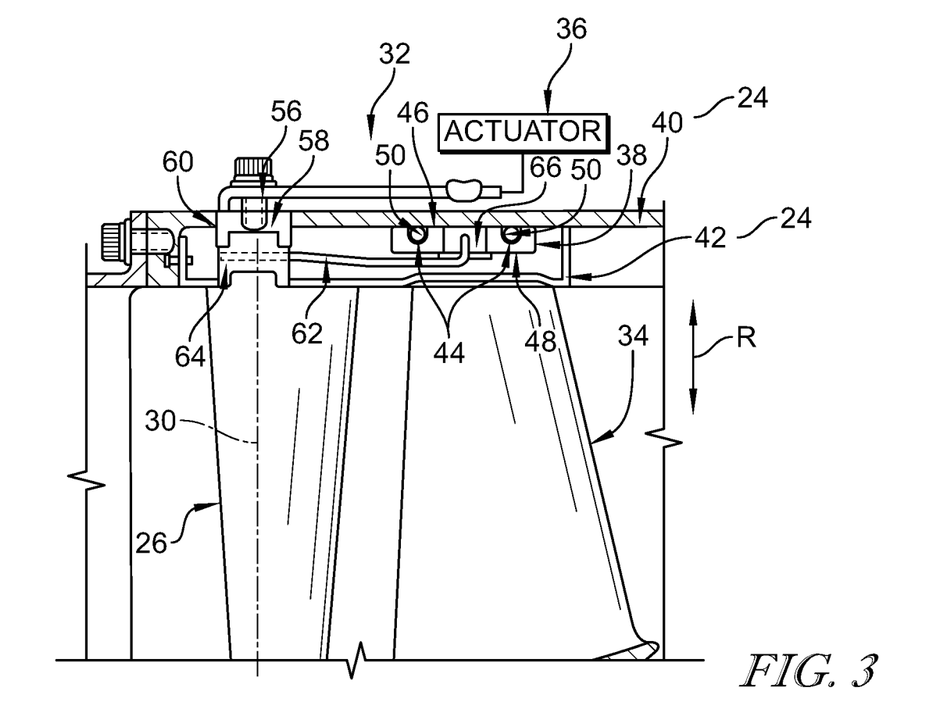
FIG. 3 is a detail view of the compressor of the gas turbine engine of FIG. 2 showing that the compressor includes a vane actuation system having an actuator and an actuation ring coupled to a vane and arranged radially inward of a portion of the compressor case relative to the central axis, and that the actuator is configured to drive movement of the actuation ring to cause rotation of vanes included in a single vane stage about a vane axis generally perpendicular to the central axis.
Figure 3A:
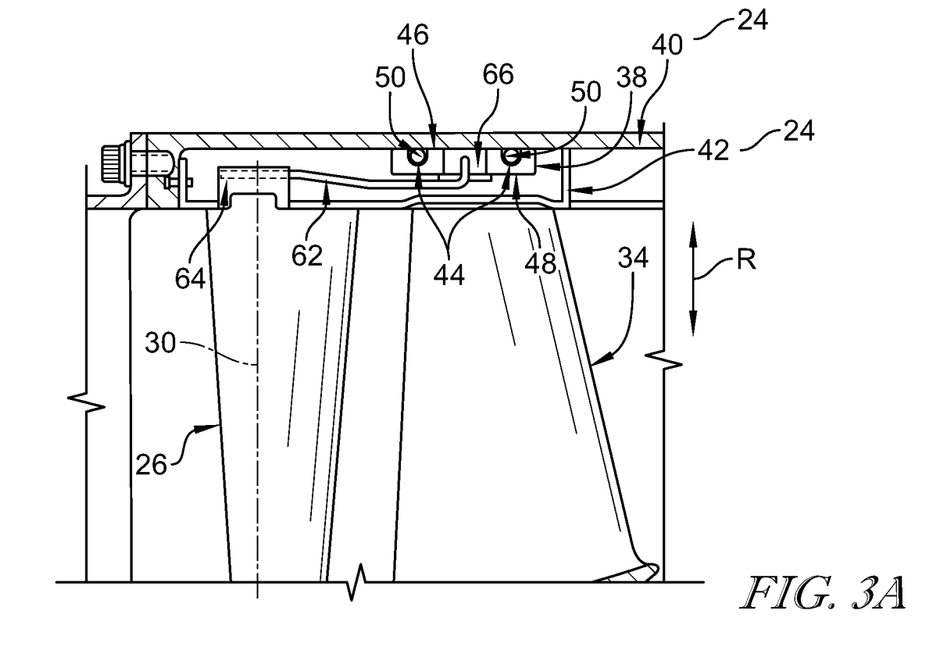
FIG. 3A is a detail view like the view of FIG. 3 showing the compressor at a different circumferential location without the outer actuation arm.

Referring now to FIG. 3, the compressor 14 illustratively includes a vane actuation system 32 configured to drive rotation of each vane 26 about the vane axis 30. Such rotation of the vanes 26 adjusts the angles at which air passed over the vane stages 28 is provided to stages of compressor blades 34 configured for rotation about the central axis 22 during operation of the gas turbine engine 12. Adjustment of those angles may minimize flow separation in certain operating situations to improve performance of the compressor 14 and the engine 12.

The vane actuation system 32 illustratively includes one actuator 36 and one actuation ring 38 as shown in FIG. 3. The actuator 36 is arranged outward in a radial direction indicated by arrow R of an outer portion 40 of the compressor case 24 relative to the central axis 22. The actuation ring 38 is arranged radially inward of the outer portion 40 relative to the central axis 22 between the outer portion 40 and an inner portion 42 of the case 24 located radially inward of the portion 40 relative to the axis 22. The actuation ring 38 is coupled to one or more of the vanes 26 and the actuator 36 is configured to drive movement of the actuation ring 38 to cause rotation of one or more of the vanes 26 about the vane axis 30.

In some embodiments, the actuator 36 may be embodied as, or otherwise include, a hydraulically-operated actuator such as a hydraulic piston. In other embodiments, the actuator 36 may be embodied as, or otherwise include, an electrically-powered actuator such as an electrically-powered linear actuator or a rotary servo actuator. In other embodiments still, the actuator 36 may be embodied as, or otherwise include, a pneumatically-powered actuator. In other embodiments still, the actuator 36 may be embodied as, or otherwise include, a fueldraulic actuator.

The outer portion 40 of the compressor case 24 is illustratively an annular component having a one-piece construction that surrounds the actuation ring 38 when the compressor 14 is assembled as shown in FIG. 3. The actuation ring 38 is illustratively an annular component having a split, two-piece construction. During disassembly of the compressor 14, the construction of the actuation ring 38 facilitates removal of the actuation ring 38 from the surrounding outer portion 40. During assembly of the compressor 14, the construction of the actuation ring 38 facilitates installation of features 50 in the actuation ring 38 that allow interaction between the ring 38 and the portion 40.

The actuation ring 38 is illustratively formed to include circumferential, generally V-shaped channels 44 that open toward the outer portion 40 of the compressor case 24 when the compressor 14 is assembled as shown in FIG. 3. In the illustrative embodiment, two channels 44 are formed in an outer side 46 of the actuation ring 38 arranged radially outward of an inner side 48 of the ring 38 relative to the central axis 22. In other embodiments, however, another suitable number of channels 44 may be formed in the outer side 46 of the actuation ring 38.

The channels 44 of the actuation ring 38 are each illustratively sized to receive rollers 50 as shown in FIG. 3. When the compressor 14 is assembled, the rollers 50 are configured to engage the outer portion 40 of the compressor case 24 to permit movement of the actuation ring 38 relative to the portion 40. As such, the actuation ring 38 does not directly contact the outer portion 40 during operation of the compressor 14. Rather, the rollers 50 directly contact the actuation ring 38 and the outer portion 40 to reduce friction and allow interaction between the ring 38 and the portion 40 when the compressor 14 is assembled.

Figure 4:
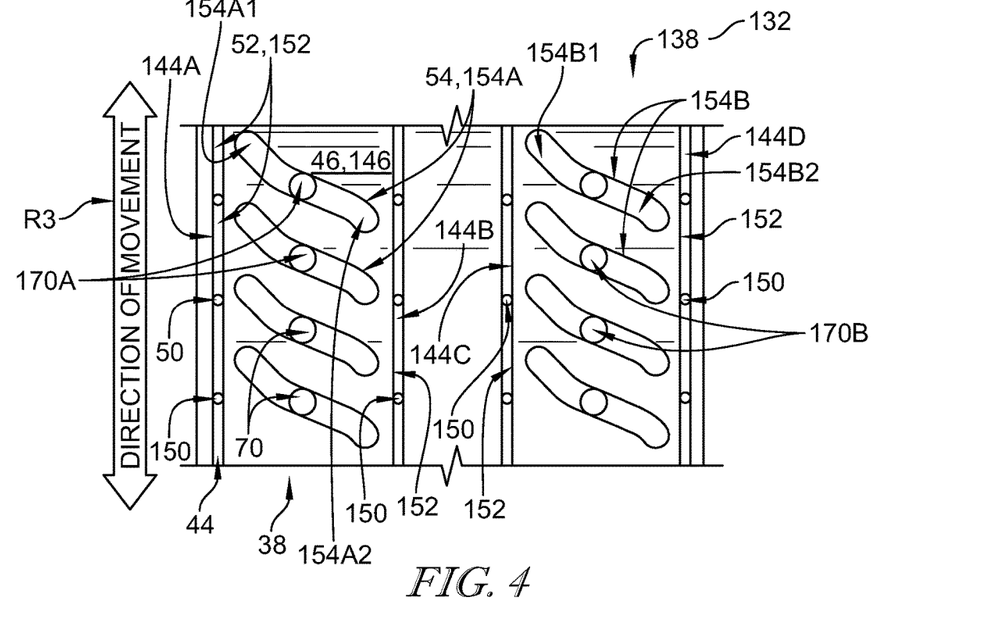
FIG. 4 is a top view of an actuation ring of another vane actuation system adapted for use in the compressor of FIG. 3 showing that the actuation ring is configured for rotation about a central axis relative to the compressor case to drive rotation of multiple vanes about vane axes generally perpendicular to the central axis, the actuation ring is formed to include channels sized to receive rollers and spacers cooperating to permit rotation of the actuation ring about the central axis relative to the compressor case, and the actuation ring is formed to include grooves sized to receive followers coupled to the vanes such that rotation of the actuation ring about the central axis drives movement of the followers in the grooves to cause rotation of the vanes about the vane axes.

Referring now to FIG. 4, the actuation ring 38 is shown in greater detail. Whereas numeral 38 is used in FIG. 4 to refer to the actuation ring used in the vane actuation system 32 described above with reference to FIG. 3, numeral 138 is used in FIG. 4 to refer to an actuation ring used in the vane actuation system 132 described below with reference to FIG. 5. Except for the differences described herein, the actuation rings 38, 138 are substantially similar to one another.

The channels 44 of the actuation ring 38 are also each illustratively sized to receive spacers 52 as shown in FIG. 4. When the compressor 14 is assembled, the spacers 52 are each arranged between circumferentially adjacent rollers 50 and configured to control spacing between the circumferentially adjacent rollers 50.

The outer side 46 of the actuation ring 38 is illustratively formed to include grooves 54 as shown in FIG. 4. The grooves 54 are formed in the side 46 between the channels 44. The grooves 54 are sized to receive features 70 used to couple the actuation ring 38 to the one or more vanes 26 to cause movement of the actuation ring 38 driven by the actuator 36 to cause rotation of the one or more vanes 26 about the vane axis 30.

Referring back to FIG. 3, the vane actuation system 32 illustratively includes at least one outer actuation arm 56 arranged radially outward of the outer portion 40 of the compressor case 24 relative to the central axis 22. The at least one outer actuation arm 56 is coupled to the actuator 36 and the actuation ring 38 to cause movement of the actuation arm 56 driven by the actuator 36 to drive movement of the actuation ring 38. The outer actuation arm 56 is supported for movement relative to the outer portion 40 by an outer actuation arm bushing 58 received in an aperture 60 formed in the outer portion 40.

The vane actuation system 32 illustratively includes at least one inner actuation arm 62 arranged radially inward of the outer portion 40 of the compressor case 24 relative to the central axis 22 as shown in FIG. 3. The at least one inner actuation arm 62 is coupled to the actuation ring 38 and one or more of the vanes 26 to cause movement of the actuation arm 62 driven by the actuation ring 38 to drive rotation of one or more of the vanes 26 about the vane axis 30. The inner actuation arm 62 is coupled to one of the vanes 26 by an inner actuation arm bushing 64 attached to the vane 26 and supporting the vane 26 for movement relative to the inner portion 42. Additionally, the inner actuation arm 62 is supported for movement relative to the actuation ring 38 by an actuation ring bushing 66 received by the actuation ring 38.

Referring now to FIGS. 3 and 4, followers 70 are coupled directly to the at least one inner actuation arm 62 and received by the grooves 54 formed in the actuation ring 38. The followers 70 are configured for movement in the grooves 54 in response to movement of the actuation ring 38 driven by the actuator 36. Movement of the followers 70 in the grooves 54 drives movement of the at least one inner actuation arm 62. As such, the followers 70 couple the actuation ring 38 to the one or more vanes 26 to cause movement of the actuation ring 38 driven by the actuator 36 to cause rotation of the one or more vanes 26 about the vane axis 30.

Referring again to FIG. 3, operation of the vane actuation system 32 will now be described. In the illustrative embodiment, the vane actuation system 32 controls rotation of one or more vanes 26 of a single stage of vanes 28. To do so, the vane actuation system 32 provides one actuator 36, one actuation ring 38, at least outer actuation arm 56, and at least one inner actuation arm 62.

In other embodiments, the vane actuation system 32 may control rotation of one or more vanes 26 in multiple vane stages 28. In such embodiments, the vane actuation system 32 may provide one actuator 36, one actuation ring 38, at least one outer actuation arm 56, and at least one inner actuation arm 62 dedicated to controlling rotation of one or more vanes 26 in each vane stage 28.

During operation of the gas turbine engine 12, it may be desirable to rotate one or more of the vanes 26 in one vane stage 28. Should this be the case, the actuator 36 may be activated so that the actuator 36 drives movement of the at least one outer actuation arm 56. Because the at least one arm 56 is coupled to the actuation ring 38, movement of the at least one arm 56 drives movement of the actuation ring 38. Movement of the actuation ring 38 causes movement of one or more of the followers 70 in the grooves 54. Because the one or more of the followers 70 are directly coupled to the at least one inner actuation arm 62, movement of one or more of the followers 70 drives movement of the at least one arm 62. Movement of the at least one arm 62 causes rotation of one or more of the vanes 26 in the one vane stage 28 about the vane axis 30.

Referring still to FIG. 3, in the illustrative embodiment, the actuation ring 38 is configured for rotation as indicated by the arrow R1 about the central axis 22 to drive rotation of one or more of the vanes 26 about the vane axis 30. Thus, the actuator 36 is configured to drive rotation of the actuation ring 38 about the central axis 22 to cause rotation of one or more of the vanes 26 about the vane axis 30. In other embodiments, however, the actuation ring 38 may be configured for translation along the central axis 22 to drive rotation of one or more of the vanes 26 about the vane axis 30.

Figure 5:
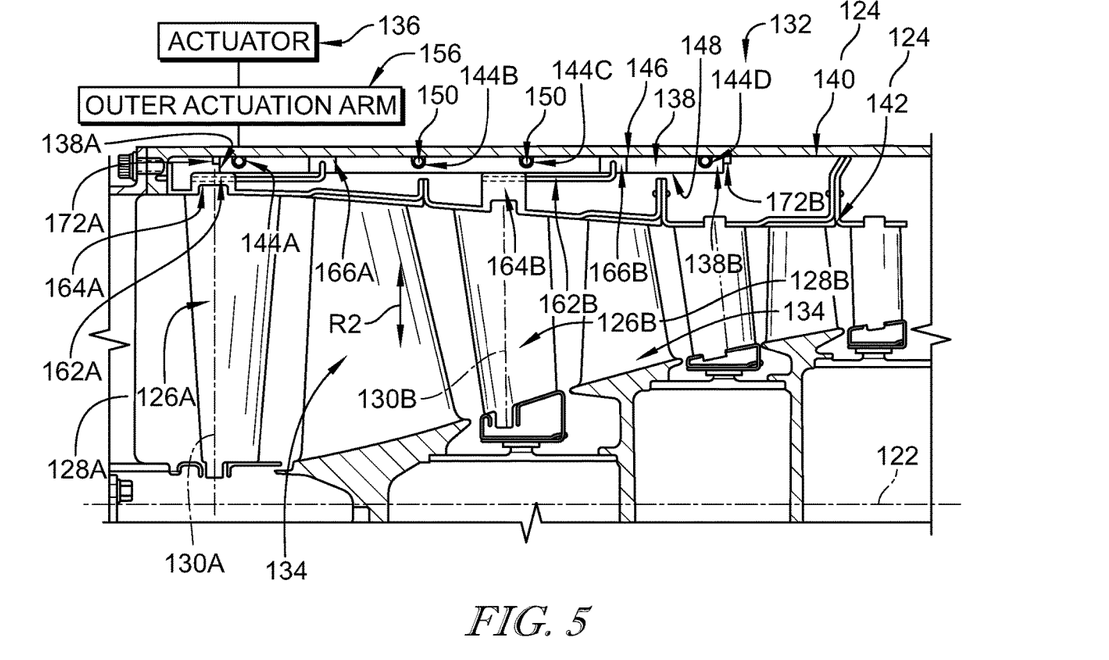
FIG. 5 is a side elevation view of the vane actuation system of FIG. 4 showing that the actuation ring is coupled to vanes included in vane stages spaced apart from one another along the central axis and that an actuator included in the vane actuation system is configured to drive rotation of the actuation ring about the central axis to cause rotation of the vanes in the spaced-apart vane stages about the vane axes.

Referring now to FIGS. 4 and 5, another vane actuation system 132 adapted for use in the compressor 14 of the gas turbine engine 12 is shown. The vane actuation system 132 is configured to drive rotation of each vane 126 about a vane axis 130. Such rotation of the vanes 126 adjusts the angles at which air passed over vane stages 128 is provided to stages of compressor blades 134 configured for rotation about a central axis 122 during operation of the gas turbine engine 12. Adjustment of those angles may minimize flow separation in certain operating situations to improve performance of the compressor 14 and the engine 12.

The vane actuation system 132 illustratively includes one actuator 136 and one actuation ring 138 as shown in FIGS. 4 and 5. The actuator 136 is arranged outward in a radial direction indicated by arrow R2 of an outer portion 140 of a compressor case 124 relative to the central axis 122. The actuation ring 138 is arranged radially inward of the outer portion 140 relative to the central axis 122 between the outer portion 140 and an inner portion 142 of the case 124 located radially inward of the portion 140 relative to the axis 122. The actuation ring 138 is coupled to one or more of vanes 126A of vane stage 128A and the actuator 136 is configured to drive movement of the actuation ring 138 to cause rotation of one or more of the vanes 126A about a vane axis 130A. Additionally, the actuation ring 138 is coupled to one or more of vanes 126B of vane stage 128B and the actuator 136 is configured to drive movement of the ring 138 to cause rotation of one or more of the vanes 126B about a vane axis 130B.

In some embodiments, the actuator 136 may be embodied as, or otherwise include, a hydraulically-operated actuator such as a hydraulic piston. In other embodiments, the actuator 136 may be embodied as, or otherwise include, an electrically-powered actuator such as an electrically-powered linear actuator or a rotary servo actuator. In other embodiments still, the actuator 136 may be embodied as, or otherwise include, a pneumatically-powered actuator. In other embodiments still, the actuator 136 may be embodied as, or otherwise include, a fueldraulic actuator.

The outer portion 140 of the compressor case 124 is illustratively an annular component having a one-piece construction that surrounds the actuation ring 138 when the compressor 14 is assembled as shown in FIG. 5. The actuation ring 138 is illustratively an annular component having a split, two-piece construction. During disassembly of the compressor 14, the construction of the actuation ring 138 facilitates removal of the actuation ring 138 from the surrounding outer portion 140. During assembly of the compressor 14, the construction of the actuation ring 138 facilitates installation of features 150 in the actuation ring 138 that allow interaction between the ring 138 and the portion 140.

The actuation ring 138 is illustratively formed to include circumferential, generally V-shaped channels 144 that open toward the outer portion 140 of the compressor case 124 when the compressor 14 is assembled as shown in FIGS. 4 and 5. In the illustrative embodiment, four channels 144A, 144B, 144C, 144D are formed in an outer side 146 of the actuation ring 138 arranged radially outward of an inner side 148 of the ring 138 relative to the central axis 122. In other embodiments, however, another suitable number of channels 144 may be formed in the outer side 146 of the actuation ring 138.

The channels 144 of the actuation ring 138 are each illustratively sized to receive rollers 150 as shown in FIG. 4. When the compressor 14 is assembled, the rollers 150 are configured to engage the outer portion 140 of the compressor case 124 to permit movement of the actuation ring 138 relative to the portion 140. As such, the actuation ring 138 does not directly contact the outer portion 140 during operation of the compressor 14. Rather, the rollers 150 directly contact the actuation ring 138 and the outer portion 140 to reduce friction and allow interaction between the ring 138 and the portion 140 when the compressor 14 is assembled.

The channels 144 of the actuation ring 138 are also illustratively sized to receive spacers 152 as shown in FIG. 4. When the compressor 14 is assembled, the spacers 152 are each arranged between circumferentially adjacent rollers 150 and configured to control spacing between the circumferentially adjacent rollers 150.

The outer side 146 of the actuation ring 138 is illustratively formed to include grooves 154 as shown in FIG. 4. Grooves 154A are formed in the side 146 between the channels 144A, 144B and grooves 154B are formed in the side 146 between the channels 144C, 144D. The grooves 154 are sized to receive features 170 that couple the actuation ring 138 to the one or more vanes 126 to cause movement of the actuation ring 138 driven by the actuator 136 to cause rotation of the one or more vanes 126 about the vane axis 130.

The illustrative grooves 154A, 154B have respective forward ends 154A1, 154B1 and respective aft ends 154A2, 154B2 as shown in FIG. 4. The aft ends 154A2, 154B2 are arranged aft of the forward ends 154A1, 154B1 along the central axis 122. Each of the forward ends 154A1, 154B1 and each of the aft ends 154A2, 154B2 extends at an angle to the central axis 122.

The vane actuation system 132 illustratively includes at least one outer actuation arm 156 arranged radially outward of the outer portion 140 of the compressor case 124 relative to the central axis 122 as shown in FIG. 5. The outer actuation arm 156 is coupled to the actuator 136 and the actuation ring 138 to cause movement of the actuation arm 156 driven by the actuator 136 to drive movement of the actuation ring 138. The outer actuation arm 156 is supported for movement relative to the outer portion 140 by an outer actuation arm bushing (not shown).

The vane actuation system 132 illustratively includes inner actuation arms 162 arranged radially inward of the outer portion 140 of the compressor case 124 relative to the central axis 122 as shown in FIG. 5. Inner actuation arm 162A is coupled to the actuation ring 138 and one or more of the vanes 126A to cause movement of the actuation arm 162A driven by the actuation ring 138 to drive rotation of one or more of the vanes 126A about the vane axis 130A. Inner actuation arm 162B is coupled to the actuation ring 138 and one or more of the vanes 126B to cause movement of the actuation arm 162B driven by the ring 138 to drive rotation of one or more of the vanes 126B about the vane axis 130B. Inner actuation arms 162A, 162B are coupled to respective vanes 126A, 126B by inner actuation arm bushings 164A, 164B attached to the vanes 126A, 126B and supporting the vanes 126A, 126B for movement relative to the inner portion 142. Additionally, inner actuation arms 162A, 162B are supported for movement relative to the actuation ring 138 by actuation ring bushings 166A, 1668 received by the actuation ring 138.

Followers 170 are coupled directly to the inner actuation arms 162 and received by the grooves 154 formed in the actuation ring 138 as shown in FIGS. 4 and 5. Specifically, followers 170A are coupled directly to the arm 162A and received by the grooves 154A and followers 170B are coupled directly to the arm 162B and received by the grooves 154B.

Followers 170 are configured for movement in the grooves 154 in response to movement of the actuation ring 138 driven by the actuator 136. Movement of the followers 170A, 170B in the grooves 154A, 154B drives movement of the inner actuation arms 162A, 162B. As such, the followers 170A, 170B couple the actuation ring 138 to the one or more vanes 126A, 126B to cause movement of the actuation ring 138 driven by the actuator 136 to cause rotation of the one or more vanes 126A, 126B about the vane axes 130A, 130B.

Referring again to FIGS. 4 and 5, operation of the vane actuation system 132 will now be described. In the illustrative embodiment, the vane actuation system 132 provides one actuator 136 and one actuation ring 138 to control rotation of the vane stages 128A, 128B substantially contemporaneously and in substantially the same manner. As such, the vane actuation system 132 does not control rotation of the vane stage 128A independently of rotation of the vane stage 128B.

During operation of the gas turbine engine 12, it may be desirable to rotate one or more of the vanes 126A, 126B in the vane stages 128A, 128B. Should this be the case, the actuator 136 may be activated so that the actuator 136 drives movement of the at least one outer actuation arm 156. Because the at least one outer actuation arm 156 is coupled to the actuation ring 138, movement of the at least one arm 156 drives movement of the actuation ring 138. Movement of the actuation ring 138 causes movement of one or more of the followers 170A, 170B in the grooves 154A, 154B. Because the one or more of the followers 170A, 170B are directly coupled to the inner actuation arms 162A, 162B, movement of one or more of the followers 170A, 170B drives movement of the arms 162A, 162B. Movement of the inner actuation arms 162A, 162B causes rotation of one or more of the vanes 126A, 126B in the vane stages 128A, 128B about the vane axes 130A, 130B.

Referring still to FIGS. 4 and 5, in the illustrative embodiment, the actuation ring 138 is configured for rotation as indicated by the arrow R3 about the central axis 122 to drive rotation of one or more of the vanes 126A, 126B about the vane axes 130A, 130B. Thus, the actuator 136 is configured to drive rotation of the actuation ring 138 about the central axis 122 to cause rotation of one or more of the vanes 126A, 126B about the vane axes 130A, 130B. The actuation ring 138 is constrained against translation along the central axis 122 by retaining rings 172A, 172B that are engaged with the outer portion 140 of the compressor case 124 and opposite ends 138A, 138B of the ring 138.

Figure 6:
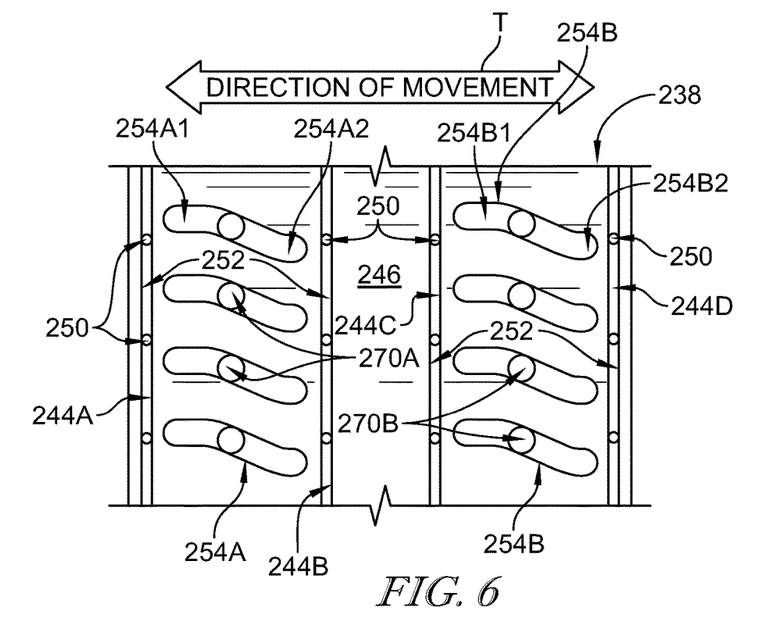
FIG. 6 is a top view of an actuation ring of yet another vane actuation system adapted for use in the compressor of FIG. 3 showing that the actuation ring is configured for translation along a central axis relative to the compressor case to drive rotation of multiple vanes about vane axes generally perpendicular to the central axis, the actuation ring is formed to include channels sized to receive rollers and spacers cooperating to permit translation of the actuation ring along the central axis relative to the compressor case, and the actuation ring is formed to include grooves sized to receive followers coupled to the vanes such that translation of the actuation ring along the central axis drives movement of the followers in the grooves to cause rotation of the vanes about the vane axes.
Figure 7:
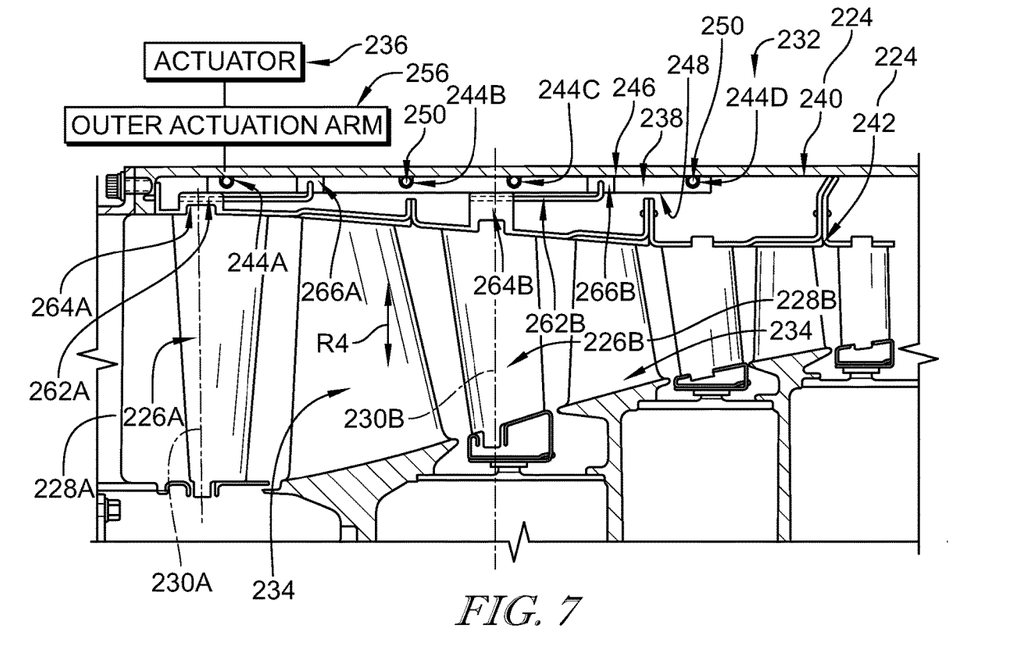
FIG. 7 is a side elevation view of the vane actuation system of FIG. 6 showing that the actuation ring is coupled to vanes included in vane stages spaced apart from one another along the central axis and that an actuator included in the vane actuation system is configured to drive translation of the actuation ring along the central axis to cause rotation of the vanes in the spaced-apart vane stages about the vane axes.

Referring now to FIGS. 6 and 7, another vane actuation system 232 adapted for use in the compressor 14 of the gas turbine engine 12 is shown. The vane actuation system 232 is configured to drive rotation of each vane 226 about a vane axis 230. Such rotation of the vanes 226 adjusts the angles at which air passed over vane stages 228 is provided to stages of compressor blades 234 configured for rotation about a central axis 222 during operation of the gas turbine engine 12. Adjustment of those angles may minimize flow separation in certain operating situations to improve performance of the compressor 14 and the engine 12.

The vane actuation system 232 illustratively includes one actuator 236 and one actuation ring 238 as shown in FIGS. 6 and 7. The actuator 236 is arranged outward in a radial direction indicated by arrow R4 of an outer portion 240 of a compressor case 224 relative to the central axis 222. The actuation ring 238 is arranged radially inward of the outer portion 240 relative to the central axis 222 between the outer portion 240 and an inner portion 242 of the case 224 located radially inward of the portion 240 relative to the axis 222. The actuation ring 238 is coupled to one or more of vanes 226A of vane stage 228A and the actuator 236 is configured to drive movement of the actuation ring 238 to cause rotation of one or more of the vanes 226A about a vane axis 230A. Additionally, the actuation ring 238 is coupled to one or more of vanes 226B of vane stage 228B and the actuator 236 is configured to drive movement of the ring 238 to cause rotation of one or more of the vanes 226B about a vane axis 230B.

In some embodiments, the actuator 236 may be embodied as, or otherwise include, a hydraulically-operated actuator such as a hydraulic piston. In other embodiments, the actuator 236 may be embodied as, or otherwise include, an electrically-powered actuator such as an electrically-powered linear actuator or a rotary servo actuator. In other embodiments still, the actuator 236 may be embodied as, or otherwise include, a pneumatically-powered actuator. In other embodiments still, the actuator 236 may be embodied as, or otherwise include, a fueldraulic actuator.

The outer portion 240 of the compressor case 224 is illustratively an annular component having a one-piece construction that surrounds the actuation ring 238 when the compressor 14 is assembled as shown in FIG. 7. The actuation ring 238 is illustratively an annular component having a split, two-piece construction. During disassembly of the compressor 14, the construction of the actuation ring 238 facilitates removal of the actuation ring 238 from the surrounding outer portion 240. During assembly of the compressor 14, the construction of the actuation ring 238 facilitates installation of features 250 in the actuation ring 238 that allow interaction between the ring 238 and the portion 240.

The actuation ring 238 is illustratively formed to include circumferential, generally V-shaped channels 244 that open toward the outer portion 240 of the compressor case 224 when the compressor 14 is assembled as shown in FIGS. 6 and 7. In the illustrative embodiment, four channels 244A, 244B, 244C, 244D are formed in an outer side 246 of the actuation ring 238 arranged radially outward of an inner side 248 of the ring 238 relative to the central axis 222. In other embodiments, however, another suitable number of channels 244 may be formed in the outer side 246 of the actuation ring 238.

The channels 244 of the actuation ring 238 are each illustratively sized to receive rollers 250 as shown in FIG. 6. When the compressor 14 is assembled, the rollers 250 are configured to engage the outer portion 240 of the compressor case 224 to permit movement of the actuation ring 238 relative to the portion 240. As such, the actuation ring 238 does not directly contact the outer portion 240 during operation of the compressor 14. Rather, the rollers 250 directly contact the actuation ring 238 and the outer portion 240 to reduce friction and allow interaction between the ring 238 and the portion 240 when the compressor 14 is assembled.

The channels 244 of the actuation ring 238 are also illustratively sized to receive spacers 252 as shown in FIG. 6. When the compressor 14 is assembled, the spacers 252 are each arranged between circumferentially adjacent rollers 250 and configured to control spacing between the circumferentially adjacent rollers 250.

The outer side 246 of the actuation ring 238 is illustratively formed to include grooves 254 as shown in FIG. 6. Grooves 254A are formed in the side 246 between the channels 244A, 244B and grooves 254B are formed in the side 246 between the channels 244C, 244D. The grooves 254 are sized to receive features 270 that couple the actuation ring 238 to the one or more vanes 226 to cause movement of the actuation ring 238 driven by the actuator 236 to cause rotation of the one or more vanes 226 about the vane axis 230.

The illustrative grooves 254A, 254B have respective forward ends 254A1, 254B1 and respective aft ends 254A2, 25462 as shown in FIG. 6. The aft ends 254A2, 25462 are arranged aft of the forward ends 254A1, 254B1 along the central axis 222. Each of the forward ends 254A1, 254B1 and each of the aft ends 254A2, 25462 extends generally parallel to the central axis 222.

The vane actuation system 232 illustratively includes at least one outer actuation arm 256 arranged radially outward of the outer portion 240 of the compressor case 224 relative to the central axis 222 as shown in FIG. 7. The at least one outer actuation arm 256 is coupled to the actuator 236 and the actuation ring 238 to cause movement of the at least one arm 256 driven by the actuator 236 to drive movement of the actuation ring 238. The outer actuation arm 256 is supported for movement relative to the outer portion 240 by an outer actuation arm bushing (not shown).

The vane actuation system 232 illustratively includes inner actuation arms 262 arranged radially inward of the outer portion 240 of the compressor case 224 relative to the central axis 222 as shown in FIG. 7. Inner actuation arm 262A is coupled to the actuation ring 238 and one or more of the vanes 226A to cause movement of the actuation arm 262A driven by the actuation ring 238 to drive rotation of one or more of the vanes 226A about the vane axis 230A. Inner actuation arm 262B is coupled to the actuation ring 238 and one or more of the vanes 226B to cause movement of the actuation arm 262B driven by the ring 238 to drive rotation of one or more of the vanes 226B about the vane axis 230B. Inner actuation arms 262A, 262B are coupled to respective vanes 226A, 226B by inner actuation arm bushings 264A, 264B attached to the vanes 226A, 226B and supporting the vanes 226A, 226B for movement relative to the inner portion 242. Additionally, inner actuation arms 262A, 262B are supported for movement relative to the actuation ring 238 by actuation ring bushings 266A, 268A received by the actuation ring 238.

Followers 270 are coupled directly to the inner actuation arms 262 and received by the grooves 254 formed in the actuation ring 238 as shown in FIGS. 6 and 7. Specifically, followers 270A are coupled directly to the arm 262A and received by the grooves 254A and followers 270B are coupled directly to the arm 262B and received by the grooves 254B.

Followers 270 are configured for movement in the grooves 254 in response to movement of the actuation ring 238 driven by the actuator 236. Movement of the followers 270A, 270B in the grooves 254A, 254B drives movement of the inner actuation arms 262A, 262B. As such, the followers 270A, 270B couple the actuation ring 238 to the one or more vanes 226A, 226B to cause movement of the actuation ring 238 driven by the actuator 236 to cause rotation of the one or more vanes 226A, 226B about the vane axes 230A, 230B.

Referring again to FIGS. 6 and 7, operation of the vane actuation system 232 will now be described. In the illustrative embodiment, the vane actuation system 232 provides one actuator 236 and one actuation ring 238 to control rotation of the vane stages 228A, 228B substantially contemporaneously and in substantially the same manner. As such, the vane actuation system 232 does not control rotation of the vane stage 228A independently of rotation of the vane stage 228B.

During operation of the gas turbine engine 12, it may be desirable to rotate one or more of the vanes 226A, 226B in the vane stages 228A, 228B. Should this be the case, the actuator 236 may be activated so that the actuator 236 drives movement of the at least one outer actuation arm 256. Because the at least one outer actuation arm 256 is coupled to the actuation ring 238, movement of the at least one arm 256 drives movement of the actuation ring 238. Movement of the actuation ring 238 causes movement of one or more of the followers 270A, 270B in the grooves 254A, 254B. Because the one or more of the followers 270A, 270B are directly coupled to the inner actuation arms 262A, 262B, movement of one or more of the followers 270A, 270B drives movement of the arms 262A, 262B. Movement of the inner actuation arms 262A, 262B causes rotation of one or more of the vanes 226A, 226B in the vane stages 228A, 228B about the vane axes 230A, 230B.

Referring still to FIGS. 6 and 7, in the illustrative embodiment, the actuation ring 238 is configured for translation as indicated by the arrow T along the central axis 222 to drive rotation of one or more of the vanes 226A, 226B about the vane axes 230A, 230B. Thus, the actuator 236 is configured to drive translation of the actuation ring 238 along the central axis 222 to cause rotation of one or more of the vanes 226A, 226B about the vane axes 230A, 230B.

Some guide vane actuation systems used in gas turbine engines may include a plurality of vanes residing inside a compressor case of a gas turbine engine. The vanes may extend through the compressor case and attach to vane actuation arms outside the compressor case. The compressor may be split into two pieces along the centerline of the compressor.

The vane actuation arms may connect to an actuation ring through spherical rollers. One or more actuators may drive the actuation ring circumferentially around the compressor case to cause the vane angle to change relative to the air flowing through the compressor. The actuation ring may have a tendency to deflect under large loads thus causing vane angles to vary from the intended angle, thereby potentially comprising surge margins.

The present disclosure may provide improvements over the aforementioned guide vane actuation systems. The present disclosure provides an actuation ring (e.g., the actuation rings 38, 138, 238) that may reside within an outer compressor case (e.g., the outer portions 40, 140, 240 of the compressor cases 24, 124, 224). Generally V-shaped channels (e.g., the channels 44, 144, 244) may be machined into the actuation ring so that balls (e.g., rollers 50, 150, 250) and spacers (e.g., spacers 52, 152, 252) can be installed into the channels.

The actuation ring may be machined as a split ring and one side (e.g., the outer sides 46, 146, 246) may be cut through such that the actuation ring may be sprung from the compressor case to facilitate installation of the balls and the spacers. The outer compressor case may be a full hoop construction rather than being split. A single case penetration (e.g., the aperture 60) for the outer compressor case may accommodate a single outer actuation arm bushing (e.g., the outer actuation arm bushing 58).

A single outer actuation arm (e.g., the outer actuation arms 56, 156, 256) may be attached to a single actuator (e.g., the actuators 36, 136, 236). The single outer actuation arm may be intended to drive a plurality of variable vanes (e.g., the vanes 26, 126, 226) through the actuation ring. Each variable vane may have an inner actuation arm bushing (e.g., inner actuation arm bushings 64, 164, 264) that penetrates an inner compressor case (e.g., the inner portions 42, 142, 242 of the compressor cases 24, 124, 224). An inner actuation arm (e.g., the inner actuation arms 62, 162, 262) may bridge the variable vane to the actuation ring through an actuation ring bushing (e.g., the actuation ring bushings 66, 166, 266).

Because the actuation rings (e.g., rings 38, 138, 238) of the present disclosure may be positioned within the outer compressor case, the present disclosure may provide a more compact vane actuation system (e.g., the vane actuation systems 32, 132, 232) than existing designs. In another respect, because the actuation ring may be positioned within the outer compressor case, fewer case penetrations may be required than might otherwise be the case if the actuation ring were positioned outside of the outer compressor case. As such, costly milling operations to make such penetrations may be avoided and/or reduced. In yet another respect, because the outer compressor case and the actuation ring may have a full hoop construction, fabrication of the outer compressor case and the actuation ring may be facilitated by the use of rolled rings and/or flange weldments. In yet another respect still, because improved concentricity of the actuation ring about a central axis (e.g., the central axis 22, 122, 222) due to the full hoop construction of the actuation ring may be achieved, the present design may permit an increased surge margin to be achieved during operation of the compressor (e.g., the compressor 14).

According to one embodiment of the present disclosure (e.g., the vane actuation system 132), a split ring (e.g., the actuation ring 138) may be retained axially through the use of retaining rings (e.g., the retaining rings 172). A single actuator may rotate the split ring inside the compressor case. Slots in the split ring (e.g., the grooves 154) may actuate link arms (e.g., the inner actuation arms 162) to vary the angles of the vanes (e.g., the angles of the vanes 126).

According to another embodiment of the present disclosure (e.g., the vane actuation system 232), a rolled split ring (e.g., the actuation ring 238) may have a series of channels (e.g., channels 244) to retain a plurality of spherical rollers (e.g., rollers 250) separated by spacers (e.g., spacers 252). The rolled split ring may also have a series of grooves (e.g., grooves 254) formed such that followers (e.g., followers 270) may actuate vanes (e.g. vanes 226) that are attached to the followers through link arms (e.g., inner actuation arms 262).

The rolled split ring may be retained within a compressor case such that it can only move axially within the case. This may be accomplished through the use of pins and a slot or grooves integral to the case.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A compressor comprising
a case extending circumferentially about a central axis,
a plurality of vanes arranged circumferentially adjacent to one another about the central axis inside the case, each one of the vanes configured for rotation about a vane axis generally perpendicular to the central axis, and
a vane actuation system including an actuator and an actuation ring coupled to one of the vanes and arranged radially inward of a portion of the case relative to the central axis, the actuator configured to drive movement of the actuation ring to cause rotation of the one of the vanes about the vane axis,
wherein the actuation ring is formed to include a plurality of circumferential channels opening radially outward toward the case and sized to receive a plurality of rollers configured to engage the case to permit movement of the actuation ring relative to the case.

2. The compressor of claim 1, wherein the vane actuation system includes a first actuation arm arranged radially outward of the portion of the case relative to the central axis and coupled to the actuator and the actuation ring to cause movement of the first actuation arm driven by the actuator to drive movement of the actuation ring.

3. The compressor of claim 2, wherein the vane actuation system includes a second actuation arm arranged radially inward of the portion of the case relative to the central axis and coupled to the actuation ring and the one of the vanes to cause movement of the second actuation arm driven by the actuation ring to drive rotation of the one of the vanes about the vane axis.

4. The compressor of claim 3, wherein the actuation ring is formed to include a groove sized to receive a follower and the follower is coupled directly to the second actuation arm such that movement of the actuation ring drives movement of the follower in the groove to drive movement of the second actuation arm.

5. The compressor of claim 1, wherein the case includes an annular case component having a one-piece construction and the actuation ring is an annular component having a two-piece construction.

6. The compressor of claim 5, wherein the actuation ring is configured to couple to the annular case component of the case when the compressor is assembled.

7. The compressor of claim 1, wherein each of the plurality of circumferential channels is sized to receive a plurality of spacers that are each arranged between circumferentially adjacent rollers and configured to control spacing between the circumferentially adjacent rollers.

8. The compressor of claim 7, wherein the actuation ring is formed to include a plurality of grooves arranged between the circumferential channels and spaced from one another about the central axis.

9. The compressor of claim 1, wherein (i) the plurality of vanes include a first stage of vanes and a second stage of vanes located aft of the first stage of vanes along the central axis, (ii) the actuation ring is coupled to one of the first stage of vanes and one of the second stage of vanes, and (iii) the actuator is configured to drive movement of the actuation ring to cause rotation of the one of the first stage of vanes about a first vane axis and rotation of the one of the second stage of vanes about a second vane axis.

10. A compressor comprising
a case extending circumferentially about a central axis,
a plurality of vanes arranged circumferentially adjacent to one another about the central axis inside the case, each one of the vanes configured for rotation about a vane axis generally perpendicular to the central axis, and
a vane actuation system including an actuator and an actuation ring coupled to one of the vanes and arranged radially inward of a portion of the case relative to the central axis, the actuator configured to drive translation of the actuation ring along the central axis to cause rotation of the one of the vanes about the vane axis,
wherein the actuation ring is formed to include a plurality of circumferential channels opening radially outward toward the case and sized to receive a plurality of rollers configured to engage the case to permit movement of the actuation ring relative to the case.

11. The compressor of claim 10, wherein the vane actuation system includes a first actuation arm coupled to the actuator and the actuation ring to cause movement of the first actuation arm driven by the actuator to drive translation of the actuation ring along the central axis.

12. The compressor of claim 11, wherein the vane actuation system includes a second actuation arm coupled to the actuation ring and the one of the vanes to cause movement of the second actuation arm driven by the actuation ring to drive rotation of the one of the vanes about the vane axis.

13. The compressor of claim 12, wherein the actuation ring is formed to include a groove sized to receive a follower and the follower is coupled directly to the second actuation arm such that translation of the actuation ring along the central axis drives movement of the follower in the groove to drive movement of the second actuation arm.

14. The compressor of claim 13, wherein the groove includes a forward end and an aft end arranged aft of the forward end along the central axis and each of the forward and aft ends extends generally parallel to the central axis.

15. A compressor comprising
a case extending circumferentially about a central axis,
a plurality of vanes arranged circumferentially adjacent to one another about the central axis inside the case, each one of the vanes configured for rotation about a vane axis generally perpendicular to the central axis, and
a vane actuation system including an actuator and an actuation ring coupled to one of the vanes and arranged radially inward of a portion of the case relative to the central axis, the actuator configured to drive rotation of the actuation ring about the central axis to cause rotation of the one of the vanes about the vane axis,
wherein the actuation ring is formed to include a plurality of circumferential channels opening radially outward toward the case and sized to receive a plurality of rollers configured to engage the case to permit movement of the actuation ring relative to the case.

16. The compressor of claim 15, wherein the actuation ring is formed to include a plurality of circumferential channels opening toward the case and sized to receive a plurality of rollers configured to engage the case to permit rotation of the actuation ring about the central axis relative to the case.

17. The compressor of claim 15, wherein the vane actuation system includes (i) a first actuation arm coupled to the actuator and the actuation ring to cause movement of the first actuation arm driven by the actuator to drive rotation of the actuation ring about the central axis and (ii) a second actuation arm coupled to the actuation ring and the one of the vanes to cause movement of the second actuation arm driven by the actuation ring to drive rotation of the one of the vanes about the vane axis.

18. The compressor of claim 17, wherein the actuation ring is formed to include a groove sized to receive a follower and the follower is coupled directly to the second actuation arm such that rotation of the actuation ring about the central axis drives movement of the follower in the groove to drive movement of the second actuation arm.

19. The compressor of claim 18, wherein the groove includes a forward end and an aft end arranged aft of the forward end along the central axis and each of the forward and aft ends extends at an angle to the central axis.

\* \* \* \* \*